(12) United States Patent
Kashima (10) Patent No.: US 7,508,474 B2
(45) Date of Patent: Mar. 24, 2009

(54) LAMINATED RETARDATION LAYER, ITS FABRICATION PROCESS, AND LIQUID CRYSTAL DISPLAY INCORPORATING THE SAME

(75) Inventor: Keiji Kashima, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/816,469

(22) Filed: Mar. 31, 2004

(65) Prior Publication Data

US 2005/0062917 A1    Mar. 24, 2005

(30) Foreign Application Priority Data

Apr. 7, 2003   (JP) .............................. 2003-102529

(51) Int. Cl.
*G02F 1/1335* (2006.01)
(52) U.S. Cl. ...................................... 349/118
(58) Field of Classification Search .......... 349/117–120
See application file for complete search history.

(56) References Cited

U.S. PATENT DOCUMENTS

| | | | | |
|---|---|---|---|---|
| 5,134,507 | A * | 7/1992 | Ishii | 349/119 |
| 6,444,280 | B1 * | 9/2002 | Matsuoka et al. | 428/1.3 |
| 6,638,582 | B1 * | 10/2003 | Uchiyama et al. | 428/1.2 |
| 6,800,697 | B2 * | 10/2004 | Uchiyama et al. | 525/469 |
| 6,885,421 | B2 * | 4/2005 | Miyachi | 349/119 |
| 2003/0169390 | A1 * | 9/2003 | Miyachi | 349/117 |

FOREIGN PATENT DOCUMENTS

| | | |
|---|---|---|
| JP | 11-133231 | 5/1999 |
| JP | 2001-194668 | 7/2001 |
| JP | 2002-372622 | 12/2002 |
| JP | 2002-372623 | 12/2002 |

* cited by examiner

*Primary Examiner*—David Nelms
*Assistant Examiner*—Phu Vu
(74) *Attorney, Agent, or Firm*—patenttm.us (57) ABSTRACT

The invention relates to a liquid crystal display that incorporates a laminated retardation layer 10 comprising a combination of a negative C-plate having a specific chromatic dispersion and a positive A-plate having a specific chromatic dispersion, used to improve the viewing angle characteristics thereof, thereby presenting high-contrast images with high color reproducibility yet with neither interference variations nor color shifts. The laminated retardation layer 10 is obtained by lamination of a retardation layer 11 having positive index anisotropy and an optical axis in a layer plane and a retardation layer 12 having negative index anisotropy and an optical axis in a normal direction to a layer plane. A stretched polymer film having inverse chromatic dispersion that causes retardation defined by an optical path difference between extraordinary light and ordinary light to become small as wavelength becomes short is used as the retardation layer 11 having positive index anisotropy and an optical axis in a layer plane, and a coating layer having normal chromatic dispersion that causes retardation defined by an optical path difference between extraordinary light and ordinary light to become large as wavelength becomes short is used as the retardation layer 12 having negative index anisotropy and an optical axis in a normal direction to a layer plane.

9 Claims, 8 Drawing Sheets

LAMINATED RETARDATION LAYER, ITS FABRICATION PROCESS, AND LIQUID CRYSTAL DISPLAY INCORPORATING THE SAME

BACKGROUND OF THE INVENTION

The present invention relates generally to a laminated retardation layer, its fabrication process, and a liquid crystal display incorporating the same, and more particularly, a retardation layer for making the viewing angle of a liquid crystal display larger and improving color reproducibility, its fabrication process, and a liquid crystal display that incorporates the same.

Featuring slim size, low weight, low power consumption and flickerless, color liquid crystal displays (liquid crystal displays referred hereinafter to as LCDs for short) have increasingly expanded market, especially in the form of notebook computers. As part of PC-dedicated displays, there is now a growing demand for desktop monitors that are by far larger than notebook computers. Further, LCDs are finding applications for just only PCs but also TVs for which CRTs have so far been primarily used.

A problem with LCDs here is that their viewing angle is narrow for two possible reasons; when a VA (vertical alignment) mode LCD is viewed from an oblique direction, the isotropy of liquid crystal molecules goes out of order, causing light that, by definition, is to be linearly transmitted as such, to be converted to elliptically polarized light, and given crossed Nicols sheet polarizers located on both sides of a liquid cell, they appear to go out of crossed alignment upon viewing from an oblique direction. As a result, there are leakages of light out of pixels that are originally designed for black display, which may otherwise flip over contrast, rendering proper display impossible. To counteract such problems, a wide-viewing-angle, vertical alignment mode LCD has been figured out, which makes use of a retardation layer to prevent leakages of light out of black display pixels even at an increased viewing angle, as set forth in patent publications 1 and 2 as well as non-patent publication 1. For the chief purpose of removal of the problem arising from the fact that the isotropy of liquid crystal molecules goes out of order upon viewing from an oblique direction, a retardation layer called a negative C-plate (as will be described later in later) is used (see patent publication 3). For the primary purpose of removal of the problem resulting from the fact that crossed Nicols sheet polarizers appear to go out of crossed alignment upon viewing from an oblique direction, retardation layers called a positive A-plate and a negative C-plate (as will be describe later in detail) are used (see non-patent publication 2).

For the positive A-plate, it is proposed to use stretched polymer films having inverse chromatic dispersion, as set forth typically in patent publications 4, 5, 6 and 9 as well as non-patent publication 3. In particular, film products proposed in patent publication 9 and non-patent publication 3 are now on market in the trade name of Pure-Ace (Teijin Limited). Patent publication 10 discloses the lamination of two stretched films having different chromatic dispersions, and non-patent publication 6 shows that with such technology, a composite film having inverse chromatic dispersion is obtainable. Non-patent publication 1 teaches that if a stretched polymer film having such inverse chromatic dispersion is used as the positive A-plate for elimination of the problem stemming from the fact that upon viewing from an oblique direction, the crossed Nicols sheet polarizers appear to go out of crossed alignment, it is then possible to hold back color shifts upon viewing a VA mode color LCD from an oblique direction.

On the other hand, non-patent publication 4 proposes that the negative C-plate may comprise a polymerizable chiral nematic (cholesteric) liquid crystal with reflection wavelengths lying in the ultraviolet region, and non-patent publication 5 proposes that the negative C-plate may comprise a discotic liquid crystal of homeo-tropic orientation.

Patent Publication 1
JP(A)10-153802
Patent Publication 2
JP (A) 11-258605
Patent Publication 3
JP(A)10-312166
Patent Publication 4
JP(A)2000-137116
Patent Publication 5
JP(A)2002-14234
Patent Publication 6
JP(A)2002-48919
Patent Publication 7
JP(A)7-258638
Patent Publication 8
JP(A)10-508882
Patent Publication 9
WO00/26705
Patent Publication 10
JP(A)2-120804
Patent Publication 11
JP(A)2000-190385
Non-Patent Publication 1
IDW '02 pp. 525-527
Non-Patent Publication 2
SID 00 DIGEST pp, 1094-1097
Non-Patent Publication 3
IDW '00 pp. 407-410
Non-Patent Publication 4
IDW '00 pp. 413-416
Non-Patent Publication 5
SID 00 DIGEST pp. 1091-1093
Non-Patent Publication 6
SID 01 DIGEST pp. 566-569

Usually, when the negative C-plate and positive A-plate are located in an LCD to improve its viewing angle characteristics, they are laminated on sheet polarizers with optical axes at specific angles (absorption axes in the case of sheet polarizers and optical axes in the case of retardation layers). However, the tackifier used to this end is different in the index of refraction than the sheet polarizers and retardation layers, offering problems in that light is reflected at their interfaces, causing the contrast of images on display to become generally low and interference variations.

Especially when the negative C-plate and positive A-plate are located on both sides of a liquid crystal cell in accordance with non-patent publication 1, some more index interfaces add up, rendering the aforesaid low-contrast and interference variation problems even more noticeable.

According to non-patent publication 1, the positive A-plate having inverse chromatic dispersion may be used to prevent color shifts upon viewing from an oblique direction. However, there is still a lot of uncertainty about what type film is to be used as the negative C-plate for elimination of the problem resulting from the fact that the isotropy of liquid crystal molecules in the liquid crystal cell goes out of order upon viewing from an oblique direction; there is still a possibility that color shifts may remain uncorrected.

SUMMARY OF THE INVENTION

In view of such problems with the prior art as described above, a primary object of the invention is to provide a liquid crystal display that incorporates a laminated retardation layer comprising a combination of a negative C-plate having a specific chromatic dispersion and a positive A-plate having a specific chromatic dispersion, used to improve the viewing angle characteristics thereof, thereby presenting high-contrast images with high color reproducibility yet with neither interference variations nor color shifts.

According to the invention, the above object is achievable by the provision of a laminated retardation layer obtained by lamination of a retardation layer having positive index anisotropy and an optical axis in a layer plane and a retardation layer having negative index anisotropy and an optical axis in a normal direction to a layer plane, characterized in that a stretched polymer film having inverse chromatic dispersion that causes retardation defined by an optical path difference between extraordinary light and ordinary light to become small as wavelength becomes short is used as said retardation layer having positive index anisotropy and an optical axis in a layer plane, and a coating layer having normal chromatic dispersion that causes retardation defined by an optical path difference between extraordinary light and ordinary light to become large as wavelength becomes short is used as said retardation layer having negative index anisotropy and an optical axis in a normal direction to a layer plane.

As the stretched polymer film having inverse chromatic dispersion in the invention, use is made of a polycarbonate film having a fluorene skeleton as obtained by stretching a liquid crystal-containing polycarbonate film; a cellulose acetate film as obtained by stretching a cellulose acetate film; a film as obtained by forming into a film a mixture of an aromatic polyester polymer having normal chromatic dispersion and an aromatic polyester polymer having inverse chromatic dispersion and stretching said film; a film as obtained by forming into a film a polymer comprising a copolymer containing monomer units capable of yielding polymers having different chromatic dispersions and stretching said film; or a composite film as obtained by lamination of two stretched films having different chromatic dispersions.

As the coating layer having normal chromatic dispersion in the invention, use is made of a polymerizable chiral nematic (cholesteric) liquid crystal layer; a polymerizable discotic liquid crystal of homeotropic structure; or a material that has negative index anisotropy and an optical axis in a normal direction to a layer plane upon coating.

Further, the present invention provides a process for the fabrication of a laminated retardation layer, wherein a stretched polymer film having inverse chromatic dispersion is used as a substrate, and a polymerizable liquid crystal layer is coated and oriented on one surface of said substrate for polymerization, thereby forming a polymerizable liquid crystal layer having normal chromatic dispersion into a film.

Furthermore, the present invention provides a liquid crystal display comprising a liquid crystal cell having a vertical alignment mode liquid crystal layer and sheet polarizers located on both sides thereof, wherein the aforesaid laminated retardation layer is interposed between one of said sheet polarizers and said liquid crystal cell.

It is then more preferable that the laminated retardation layer is located such that the positive A-plate is positioned on the sheet polarizer side and the negative C-plate is positioned on the liquid crystal cell side; the contrary is not preferable because optical compensation is less than perfection.

As described above, the present invention provides a laminated retardation layer obtained by lamination of a retardation layer having positive index anisotropy and an optical axis in a layer plane and a retardation layer having negative index anisotropy and an optical axis in a normal direction to a layer plane, characterized in that a stretched polymer film having inverse chromatic dispersion that causes retardation defined by an optical path difference between extraordinary light and ordinary light to become small as wavelength becomes short is used as said retardation layer having positive index anisotropy and an optical axis in a layer plane, and a coating layer having normal chromatic dispersion that causes retardation defined by an optical path difference between extraordinary light and ordinary light to become large as wavelength becomes short is used as said retardation layer having negative index anisotropy and an optical axis in a normal direction to a layer plane. Thus, the present invention can successfully provide a laminated retardation layer dedicated to liquid crystal displays, especially a VA mode liquid crystal display, which is constructed of easy-to-fabricate positive A-plates and negative C-plate without recourse to another film-formation substrate, alignment layer or adhesive layer and enables viewing angle characteristics to be improved with high contrast yet with neither color shifts nor inference variations.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Before giving an explanation of the laminated retardation layer according to the invention, an account is given of a retardation layer. In the invention, two kinds of retardation layers or a positive uniaxial retardation layer having an optical axis in a layer plane and a negative uniaxial retardation layer having an optical axis in a normal direction to a layer plane are used.

Figure 7A:
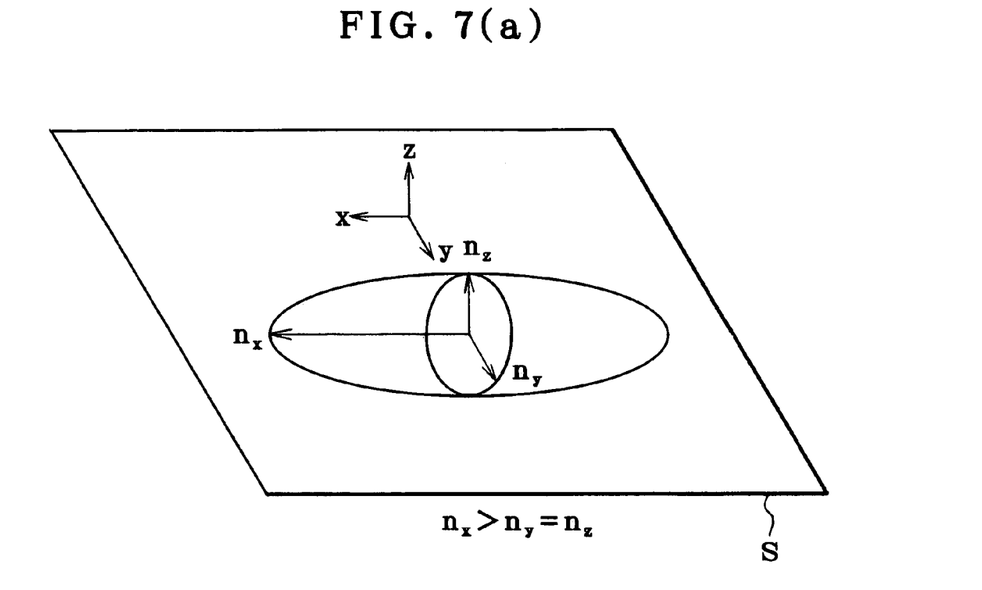
FIGS. 7(a) and 7(b) are illustrative of a positive uniaxial retardation slayer having an optical axis in a layer plane and a negative uniaxial retardation layer having an optical axis in a normal direction to a layer plane.
Figure 7B:
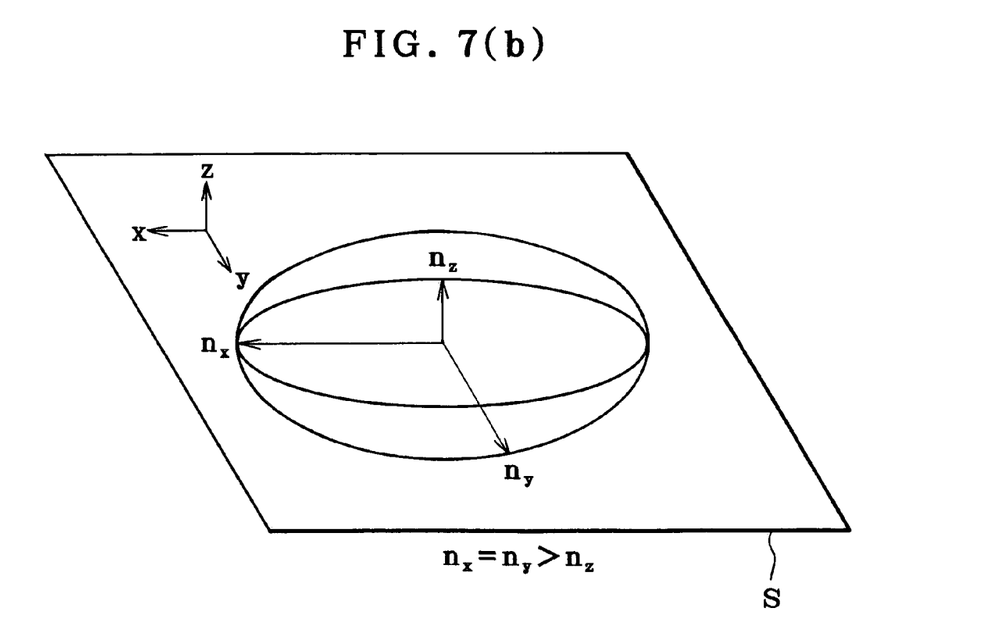

Two such retardation layers are now explained with reference to FIGS. 7(a) and 7(b). As shown, a z-axis is defined by a normal direction to a layer plane S, x- and y-axes are defined by orthogonal directions in the layer plane S, and refractive indices of the layer in the x-, y- and z-axis directions are indicated at $n_x$, $n_y$ and $n_z$. As shown in FIG. 7(a), a retardation layer that satisfies the relation of $n_x > n_y = n_z$ provides a retardation layer having an optically positive uniaxial property in the layer plane S, and will be referred to as a positive A-plate. As shown in FIG. 7(b), a retardation layer that satisfies the relation of $n_x = n_y > n_z$ provides a retardation layer having an optically negative uniaxial property in a normal direction to the layer plane S, and will be called a negative C-plate.

Figure 2A:
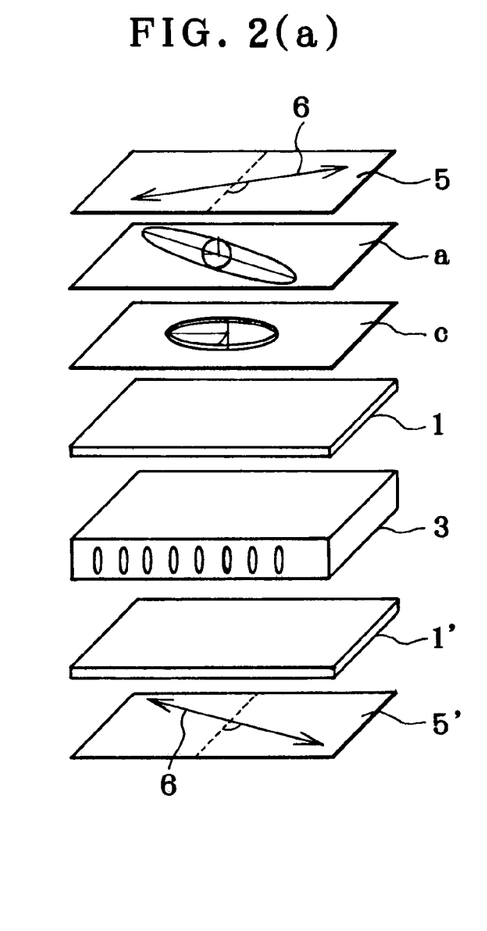
FIGS. 2(a) and 2(b) are illustrative in schematic of a liquid crystal display to which the laminated retardation layer of the invention is applied.
Figure 2B:
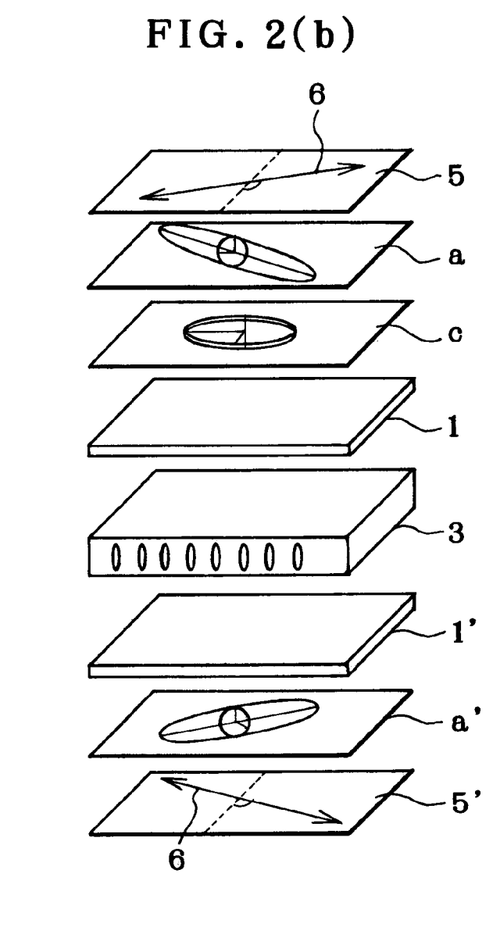

The present invention provides a liquid crystal display, for instance, a liquid crystal display of the vertical alignment mode (VA mode) which comprises a negative C-plate and a positive A-plate, wherein the negative C-plate is provided for removal of the cause of why the isotropy of liquid crystal molecules goes out of order as viewed from an oblique direction, rendering the viewing angle characteristics worse, and the positive A-plate is provided for elimination of the cause of why crossed Nicols sheet polarizers appear to go out of crossed alignment as viewed from an oblique direction, rendering the viewing angle characteristics worse. FIGS. 2(a) and 2(b) are schematically exploded perspective views of in what manners positive A-plates a and a' and a negative C-plate c are located. For instance, a liquid crystal cell comprises a VA mode liquid crystal layer 3 interposed between a backlight side-transparent substrate 1' and a viewing side-transparent substrate 1. In the arrangement of FIG. 2(a), the positive A-plate a is interposed between one transparent substrate 1 and a viewing side-sheet polarizer 5, and in the arrangement of FIG. 2(b), a positive A-plate a is interposed between a transparent substrate 1 and a sheet polarizer 5 and a positive A-plate a' is sandwiched between a transparent substrate 1' and a sheet polarizer 5'. More specifically, the positive A-plate a and sheet polarizer 5 are located in such positions that the optical axis of the former is orthogonal to the absorption axis 6 of latter to set up a liquid crystal display. Referring to FIG. 2(b), another positive A-plate a' is located between the backlight side-transparent substrate 1' and the backlight side-sheet polarizer 5'. In this case, too, the positive A-plate a' and sheet polarizer 5' are located in such positions that the optical axis of the former is orthogonal to the absorption axis 6 of the latter to set up a liquid crystal display. The negative C-plate c is positioned on the side of the positive A-plate a that faces the liquid crystal layer 3. It is noted that in the arrangement of FIG. 2(a), another negative C-plate c' (not shown) could be located on the side of the backlight side-sheet polarizer 5' that faces the liquid crystal layer 3, and in the arrangement of FIG. 2(b), another negative C-plate c' (not shown) could be located on the side of the positive A-plate a' that faces the liquid crystal layer 3. Preferably for optical compensation, the retardations Rth in the thickness direction of the negative C-plates c and c' located on both sides of the liquid crystal layer 3 should be equal to each other. In the arrangements of FIGS. 2(a) and 2(b), it is also noted that the backlight and viewing sides could be flipped over in such a way that the positive A-plate a and negative C-plate c sit on the backlight side of the liquid cell and the positive A-plate a' sits on the viewing side of the liquid cell. In FIGS. 2(a) and 2(b), the alignment layer for the liquid crystal layer 3, electrode layers, TFT for controlling each pixel, color filter located for each pixel, etc. are not shown for the sake of simplicity.

For the positive A-plates a and a' in such arrangements, stretched polymer films or composite stretched films with retardation having inverse chromatic dispersion such as those set forth in patent publications 4, 5, 6, 9 and 10 as well as non-patent publications 3 and 6 may be used thereby reducing color shifts upon viewed from an oblique direction. Typically for the positive A-plates a and a', use is made of polycarbonate films having a fluorene skeleton that are obtained by stretching liquid crystal-containing films (see patent publication 6 and non-patent publication 3), cellulose acetate films that are obtained by stretching cellulose acetate films (see patent publication 4), films that are obtained by stretching films prepared from a mixture of an aromatic polyester polymer having normal chromatic dispersion and an aromatic polyester polymer having inverse chromatic dispersion (see patent publication 5), films that are obtained by stretching films of a polymeric material comprising a copolymer containing monomers capable of yielding polymers having different chromatic dispersions (see patent publication 9), and composite films comprising two stretched films having different chromatic dispersions and laminated one upon another (see patent publication 10 and non-patent publication 6).

Figure 6:
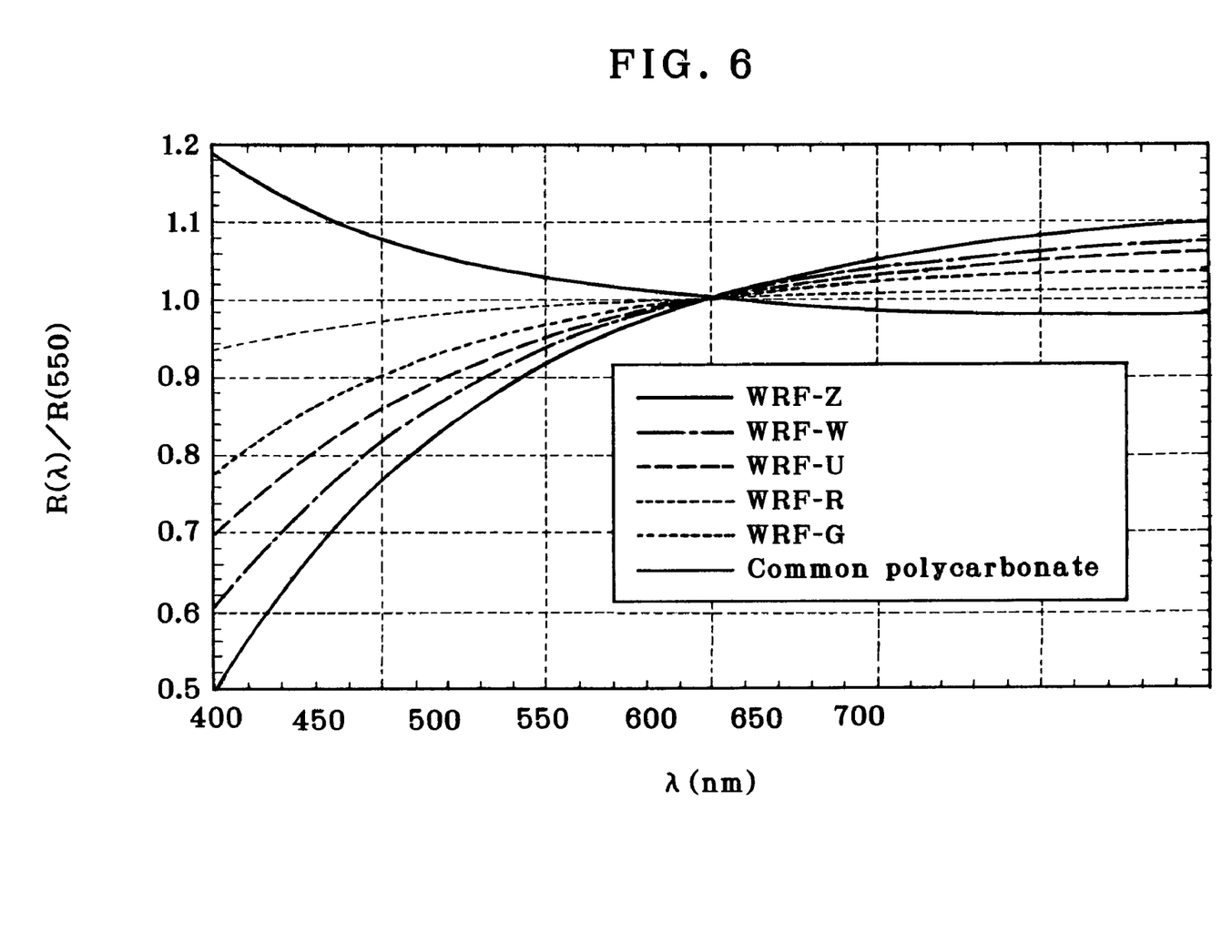
FIG. 6 is diagrammatically illustrative of the dependency on wavelength of retardation in one exemplary embodiment of a positive A-plate having inverse chromatic dispersion.

As exemplified by WRF-Z, WRF-W, WRF-U, WRF-R and WRF-G in FIG. 6, the "positive A-plates a and a' having inverse chromatic dispersion" mean retardation films wherein as wavelength becomes short, retardation $R(\lambda)$ that is an optical path difference between extraordinary light and ordinary light becomes small, where $R(\lambda) = \Delta n \cdot d$ where $\lambda$ is a wavelength, d is a film thickness, and $\Delta n = |n_e - n_o|$ provided that $n_e$ is an extraordinary index and $n_o$ is an ordinary index (see non-patent publication 6). From a comparison with a common polycarbonate film (having normal chromatic dispersion), it can be seen that there is a distinct characteristic difference. In the case of normal chromatic dispersion, retardation $R(\lambda)$ becomes large as wavelength becomes short.

With the positive A-plates a and a' having such inverse chromatic dispersion, color shifts can be reduced or held back. Possible reasons for this could be that since, in the arrangements of FIGS. 2(a) and 2(b), the positive A-plates a and a' are used in the same way as wavelength plates, the phase difference determined by dividing the aforesaid retardation $R(\lambda)(=\Delta n \cdot d)$ by wavelength $\lambda$ becomes substantially flat irrespective of wavelength; those plates can be regarded as wavelength plates having a constant phase difference over a wide wavelength range.

Figure 8:
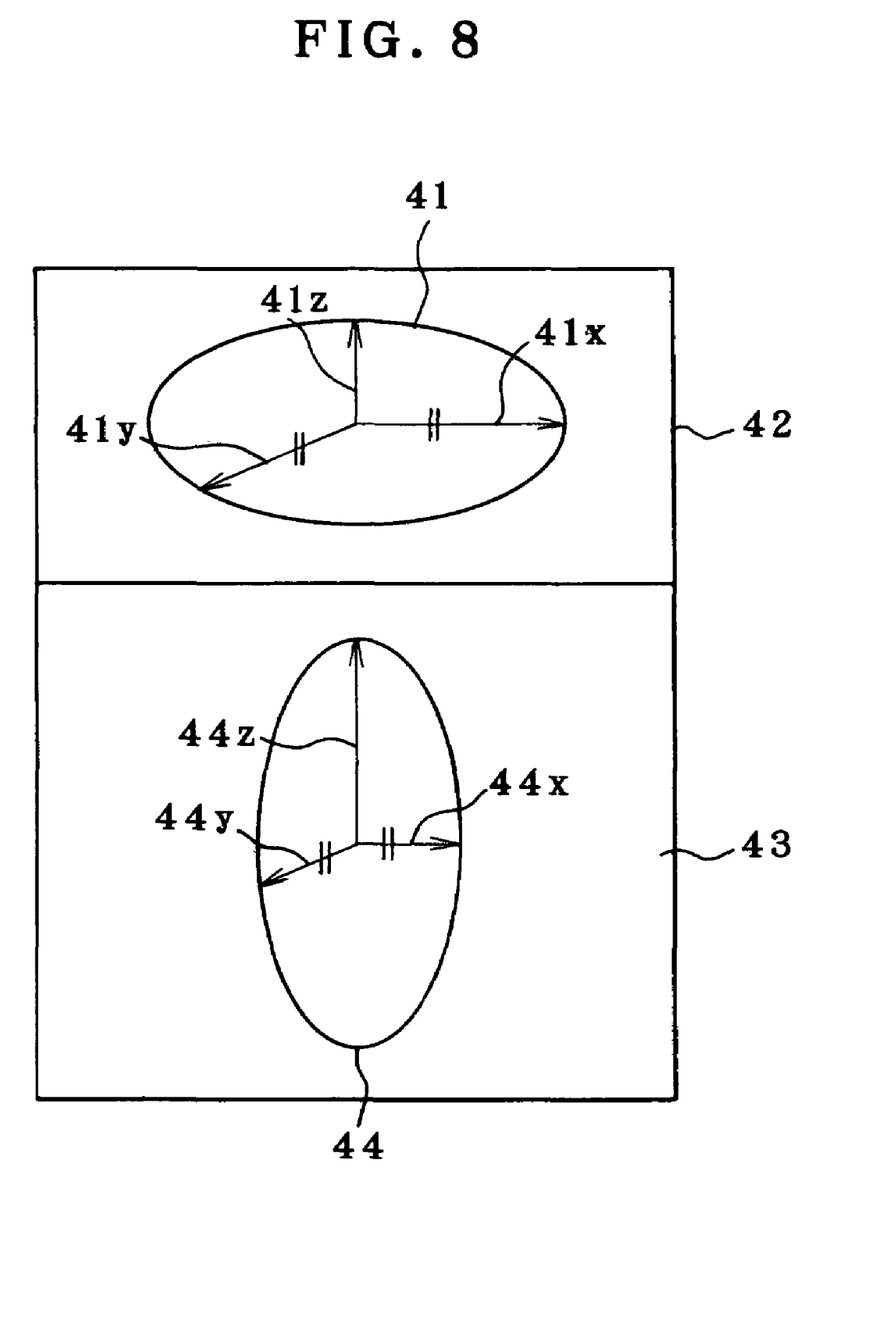
FIG. 8 is illustrative of the action of a negative C-plate.

In the arrangements of FIGS. 2(a) and 2(b), the negative C-plate c acts well to make compensation for the isotropy of liquid crystal molecules going out of order when, for instance, the VA mode liquid crystal layer 3 is viewed from an oblique direction. This action is now explained referring to patent publication 3. FIG. 8 is illustrative in schematic of a positive uniaxial liquid crystal cell index ellipsoid and a negative uniaxial optical compensation sheet (negative C-plate) index ellipsoid, which common liquid crystals have. When liquid crystal molecules in a liquid crystal cell 43 line up vertically at no applied voltage to develop positive uniaxial optical anisotropy, an index ellipsoid 44 formed by refractive indices 44x and 44y in a plane parallel with a substrate of the liquid crystal cell 43 and a refractive index 44z in the thickness direction of the liquid crystal cell 43 assumes on such an upright rugby ball shape as shown in FIG. 8. As the liquid crystal cell 43 having such an aspheric, rugby ball form of index ellipsoid is viewed from an oblique direction, there is retardation. This retardation is canceled out by a C-plate 42 that is a negative uniaxial optical compensation sheet, thereby holding back light leakages. A negative C-plate 42 index ellipsoid 41 formed by chief refractive indices 41x and 41y in a plate plane and a chief refractive index 41z in the thickness direction of the plate assumes on such a bun shape as shown in FIG. 8. For this reason, the sum of 41x and 44x, the sum of 41y and 44y and the sum of 41z and 44z become much the same value. Consequently, retardation occurring upon viewed from an oblique direction can be canceled out.

With a liquid crystal display-specific common liquid crystal layer 3 (FIG. 2) that has normal chromatic dispersion, retardation $R(\lambda)$ becomes large with decreasing wavelength; the retardation of the liquid crystal cell 43 or a difference between the chief refractive index 44z and the refractive indices 44x and 44y becomes large with decreasing wavelength. This evidently indicates that unless a plate with the difference between the chief refractive index 41z and the refractive indices 41x and 41y becoming large with decreasing wavelength is used as the negative C-plate 42, it is then impossible to prevent color shifts upon viewing the liquid crystal layer from an oblique direction.

From the foregoing considerations, it is to be understood that in a liquid crystal display arrangement such as one shown in FIG. 2(a) or 2(b), if stretched polymer films or composite films with retardation having inverse chromatic dispersion, such as those proposed in patent publications 4, 5, 6, 9 and 10 as well as non-patent publications 3 and 6, are used as the positive A-plates a and a' and a plate with retardation having the same normal chromatic dispersion as the liquid crystal layer 3 is used as the negative C-plate C, it is then possible to achieve full prevention of color shifts resulting from chromatic dispersion.

On the other hand, the negative C-plate constructed of a polymerizable chiral nematic (cholesteric) with reflection wavelengths lying in the ultraviolet region such as one proposed in non-patent publication 4 has ordinarily retardation of normal chromatic dispersion. A negative C-plate constructed of a polymerizable discotic liquid crystal of homeotropic orientation such as one proposed in non-patent publication 5, too, has ordinarily retardation of normal chromatic dispersion. Moreover, a film-forming material containing at least one aromatic ring (for instance, various polymers such as polyamides, polyimides, polyamic acids, polyesters or polyester amides or low-molecular compounds capable of yielding these polymers) such as those proposed in patent publication 11 functions as a negative C-plate and has ordinarily retardation of normal chromatic dispersion, because it has negative index anisotropy and an optical axis in a normal direction to a layer plane upon coating.

Thus, a stretched polymer film or a composite stretched polymer film with retardation having inverse chromatic dispersion is used as the positive A-plate a or a', and used as the negative C-plate c is a twisted polymerizable chiral nematic (cholesteric) liquid crystal layer wherein reflection wavelengths with retardation having normal chromatic dispersion are found in the ultraviolet region, a polymerizable discotic liquid crystal layer of homeotropic orientation or a coated layer comprising a material that functions as a C-plate upon coating.

However, whenever such a liquid crystal layer is constructed in the form of the negative C-plate c, it is necessary to rely upon a substrate on which the liquid crystal layer is to be formed, and especially whenever the chiral nematic liquid crystal layer is used, a planar layer is needed. It is also required that the positive A-plate a be laminated on the negative C-plate c formed on the substrate. This does just only require another bonding step, but there is also a possibility that light may be reflected at an interface with the adhesive (tackifier) used, resulting in a decrease in the contrast of images on display and thin-film interference variations due to interfacial reflection.

Figure 1:
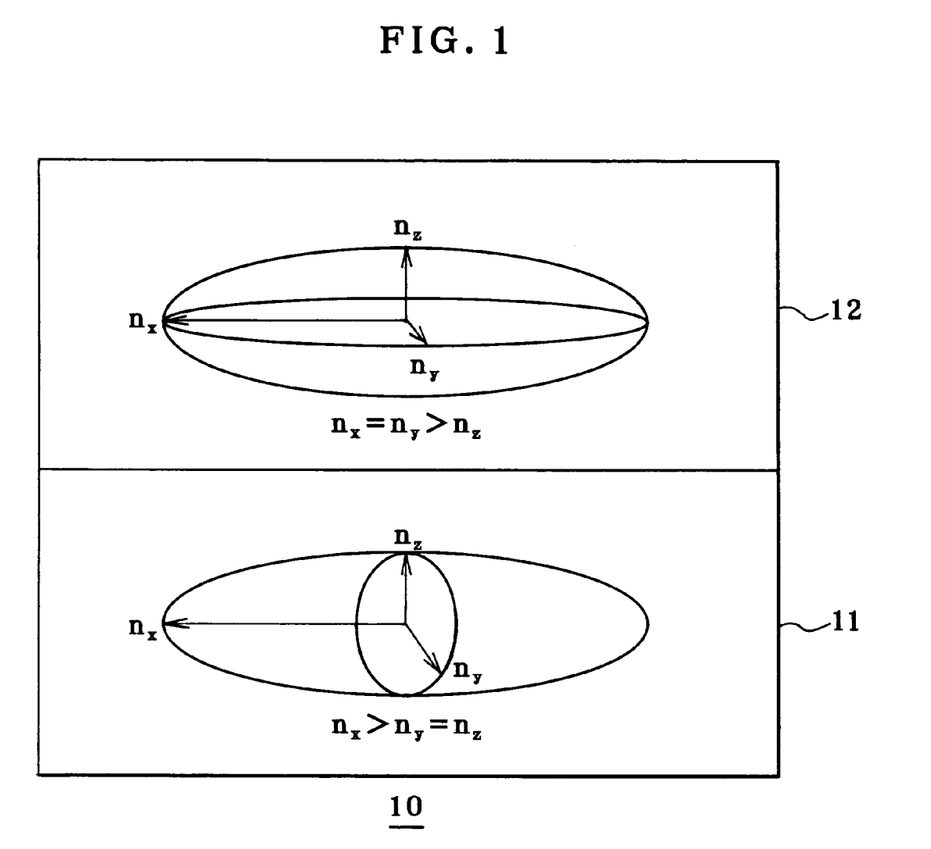
FIG. 1 is illustrative in schematic of the construction of a laminated retardation layer according to the invention.

In the invention, a stretched polymer film 11 with retardation having inverse chromatic dispersion, used for the positive A-plate a, is used as the substrate on which there is provided a coating layer 12 that functions as the negative C-plate c with retardation having normal chromatic dispersion, as shown in FIG. 1. The stretched polymer film 11 also acts as a twisted layer for the chiral nematic (cholesteric) liquid crystal layer or a homeotropic orientation layer for the discotic liquid crystal layer; there is no need for providing any separate alignment layer.

More specifically, a laminated retardation layer 10 of the invention is constructed by lamination of a retardation layer (positive A-plate a) having positive index anisotropy and an optical axis in a layer plane and a retardation layer (negative C-plate c) having negative index anisotropy and an optical axis in a normal direction to a layer plane, wherein the stretched polymer film 11 having inverse chromatic dispersion that allows retardation to become small with decreasing wavelength is used as that positive A-plate a and the coating layer 12 having normal chromatic dispersion that allows retardation to become large with decreasing wavelength is used as the negative C-plate c.

It is thus possible to achieve a laminated retardation layer well fit for liquid crystal displays, especially a VA mode liquid crystal display, which comprises a positive A-plate a and a negative C-plate c that can be easily fabricated without recourse to any separate film-formation substrate, alignment layer and adhesive layer, and which ensures high contrast and improved viewing angle characteristics with neither color shifts nor interference variations.

Although it is preferable for making most of the advantages of the invention that nothing is interposed between the positive A-plate a and the negative C-plate c, it is understood that when the stretched film is dissolved in the solvent used for coating of the coating layer, it is acceptable to provide a thin-film protective layer between them.

In the invention, for the stretched polymer film 11 that functions as the positive A-plate a and has inverse chromatic dispersion that allows retardation to become small with decreasing wavelength, use is made of polycarbonate films having a fluorene skeleton that are obtained by stretching liquid crystal-containing films (see patent publication 6 and non-patent publication 3), cellulose acetate films that are obtained by stretching films (see patent publication 4), films that are obtained by stretching films prepared from a mixture of an aromatic polyester polymer having normal chromatic dispersion and an aromatic polyester polymer having inverse chromatic dispersion (see patent publication 5), films that are obtained by stretching films of a polymeric material comprising a copolymer containing monomers capable of forming polymers having different chromatic dispersions (see patent publication 9), and composite films comprising two stretched films having different chromatic dispersions and laminated one upon another (see patent publication 10 and non-patent publication 6).

In the invention, the liquid crystal monomer molecule that may be used for a three-dimensionally cross-linkable, twisted polymerizable chiral nematic (cholesteric) liquid crystal layer with reflection wavelengths lying in the ultraviolet region, which may be used for the coating layer 12 that functions as the negative C-plate c, includes a mixture of liquid crystal monomers with a chiral compound such as those set forth typically in patent publications 7 and 8. Exemplary such polymerizable liquid crystal materials include compounds represented by the following general formula (11) or a mixture that comprises two or more of the compounds having the following formulae (1) to (10). Preferably in general formula (11) indicative of liquid crystal monomers, X is an integer of 2 to 5.

The chiral agents usable herein, for instance, include those represented by the following general formulae (12) to (14). Preferably in general formulae (12) and (13) indicative of chiral agents, X is an integer of 2 to 12, and desirously in general formula (14) indicative of chiral agents, X is an integer of 2 to 5.

CHEMICAL FORMULA 1

CHEMICAL FORMULA 2

CHEMICAL FORMULA 3

CHEMICAL FORMULA 4

CHEMICAL FORMULA 5

CHEMICAL FORMULA 6

CHEMICAL FORMULA 7

CHEMICAL FORMULA 8

CHEMICAL FORMULA 9

CHEMICAL FORMULA 10

CHEMICAL FORMULA 11

CHEMICAL FORMULA 12

CHEMICAL FORMULA 13

CHEMICAL FORMULA 14

The laminated retardation layer of the invention and how to fabricate the same are now explained at great length with reference to examples.

(1) Primer Film, i.e., Stretched Polymer Film 11 (Positive A-Plate a)

Figure 3:
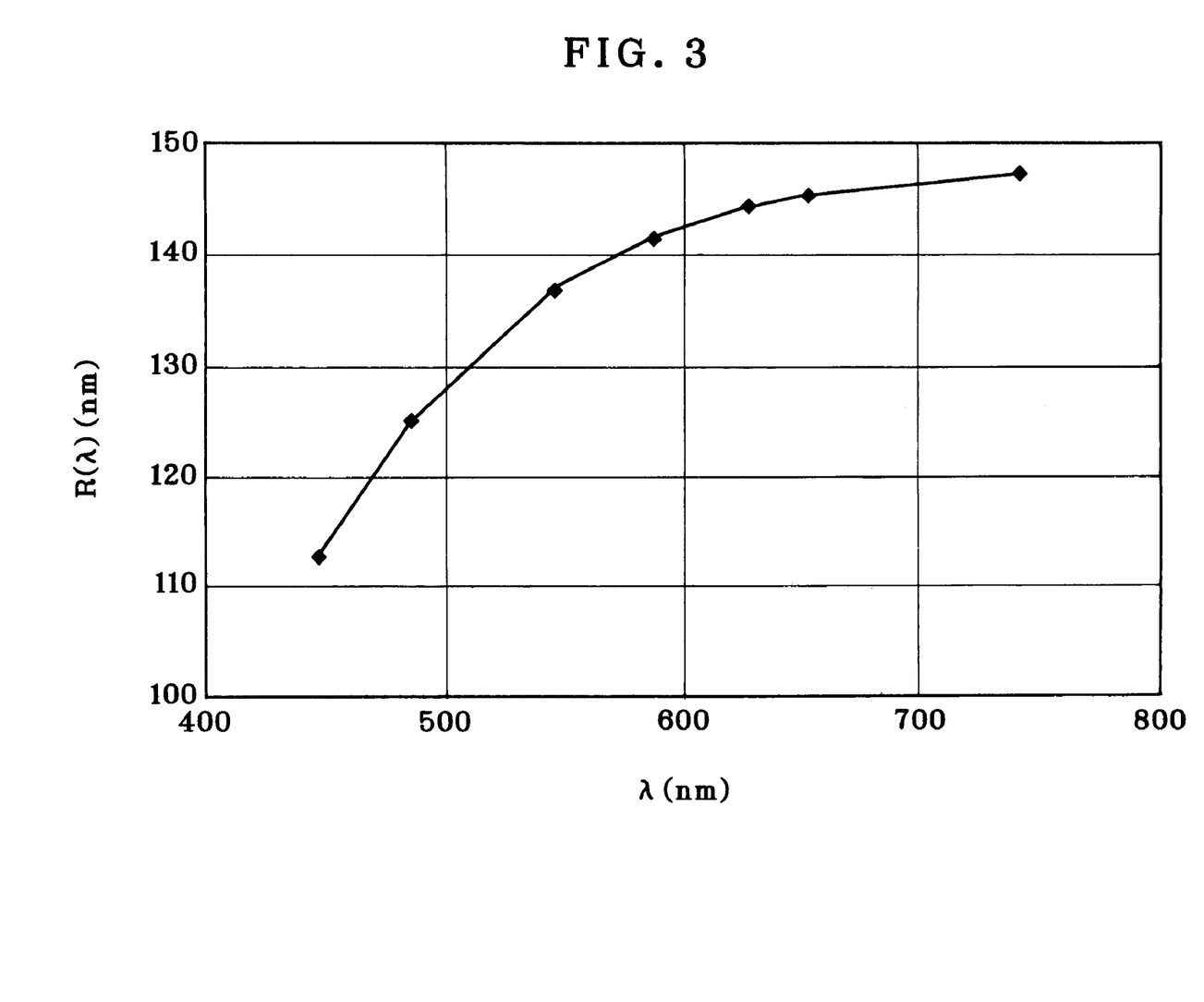
FIG. 3 is diagrammatically illustrative of the dependency on wavelength of the retardation of a stretched high-molecular film primer layer used in one embodiment of the laminated retardation layer of the invention.

A polycarbonate film (Pure-Ace WR made by Teijin Limited) was used for the primer film, i.e., the stretched polymer film 11 (the positive A-plate a). Comprising a copolymer containing monomer units capable of yielding polymers having different chromatic dispersions, this polycarbonate was obtained through stretching by casting, with a thickness of 80 μm and retardation R(λ) of FIG. 3 (R(λ)=Δn·d where λ is a wavelength, d is a film thickness, and $\Delta n = |n_e - n_o|$ provided that $n_e$ is an extraordinary index and $n_o$ is an ordinary index)

(2) Ink Preparation

A polymerizable liquid crystal ink for the negative C-plate c was prepared by mixing together 75 parts by weight of a liquid crystal material having polymerizable acrylate groups at both terminals and a spacer between mesogen at the center site and the acrylate groups, 1 part by weight of Irgacure Irg184 (made by Chiba Speciality Chemicals) as a photopolymerization initiator and 25 parts by weight of toluene as a solvent, and adding to the resulting mixture 10 parts by weight of a chiral agent or material having polymerizable acrylate groups at both terminals.

(3) Formation of Chiral Nematic (Cholesteric) Liquid Crystal Layer 12

By means of spin coating, the ink obtained as mentioned above was coated on the stretched polymer film 11 obtained at (1). While spin coating was used in this example, it should be understood that any desired coating means could be used on condition that a uniform coating is obtainable on the substrate. By way of illustration but not by way of limitation, die coating, slit coating, bar coating, slide coating, roll coating and micro-gravure coating could be used alone or in combination of two or more.

Subsequently, the film with the polymerizable liquid crystal ink coated on it was heated on a hot plate at 100° C. for 5 minutes for removal of solvent residues, thereby developing a twisted liquid crystal structure.

Subsequently, the coated liquid crystal layer was irradiated with ultraviolet radiation (20 mJ/cm² and 365-nm wavelength) to obtain a laminated film structure made up of a 4.0-μm thick chiral nematic (cholesteric) liquid crystal layer 12. The liquid crystal layer was found to have a helical pitch of 180 nm and a reflection wavelength of 280 nm.

Figure 4:
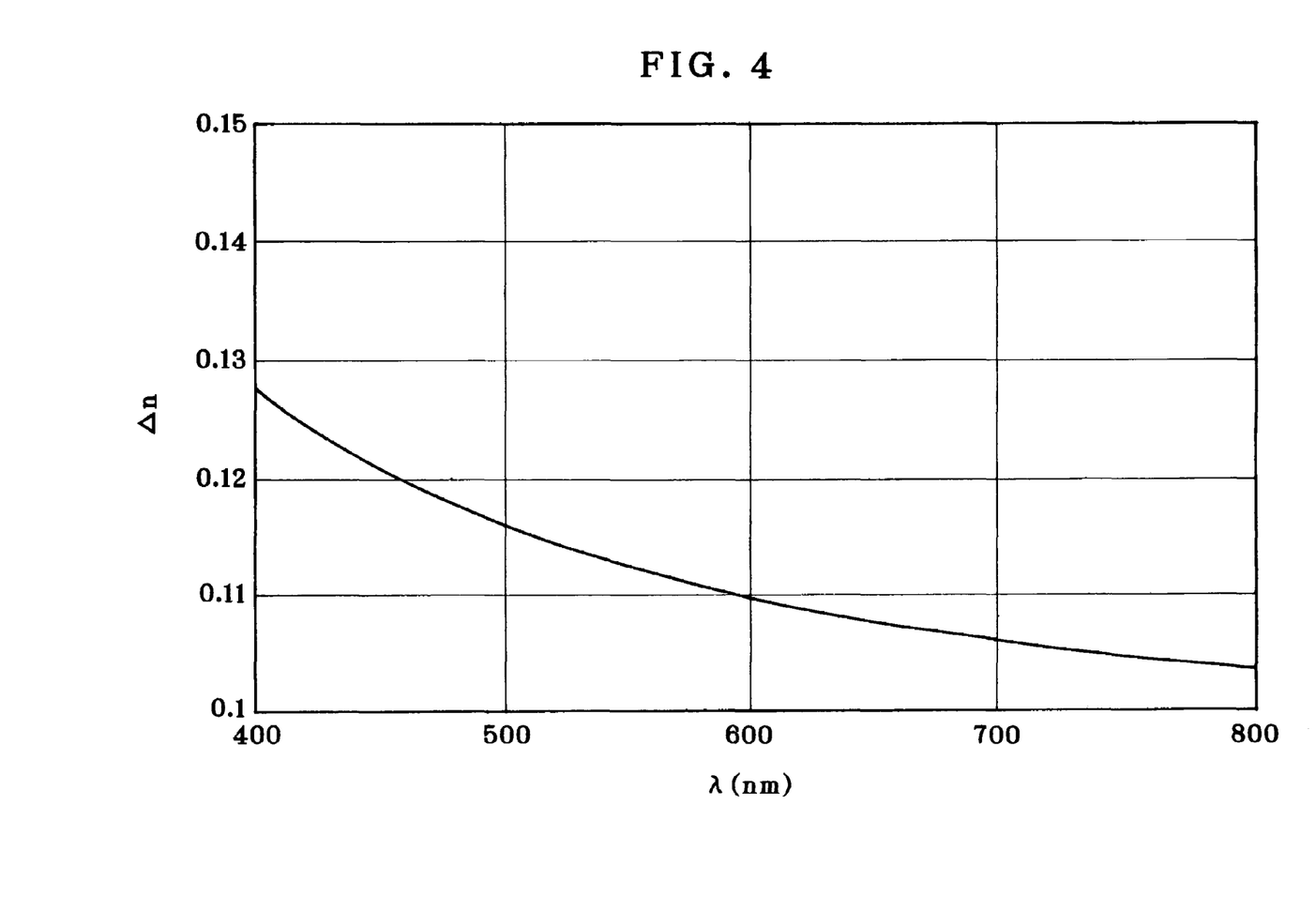
FIG. 4 is diagrammatically illustrative of the dependency on wavelength of the double refractive index of a chiral nematic (cholesteric) liquid crystal layer used in one embodiment of the laminated retardation layer of the invention.

The dependency on wavelength of the double refraction index $\Delta n$ ($= |n_e - n_o|$ ($n_e$ is an extraordinary index and $n_o$ is an ordinary index) of the resulting chiral nematic (cholesteric) liquid crystal layer 12 is shown in FIG. 4, indicating that retardation R(k) (=Δn·d) has normal chromatic dispersion.

Figure 5:
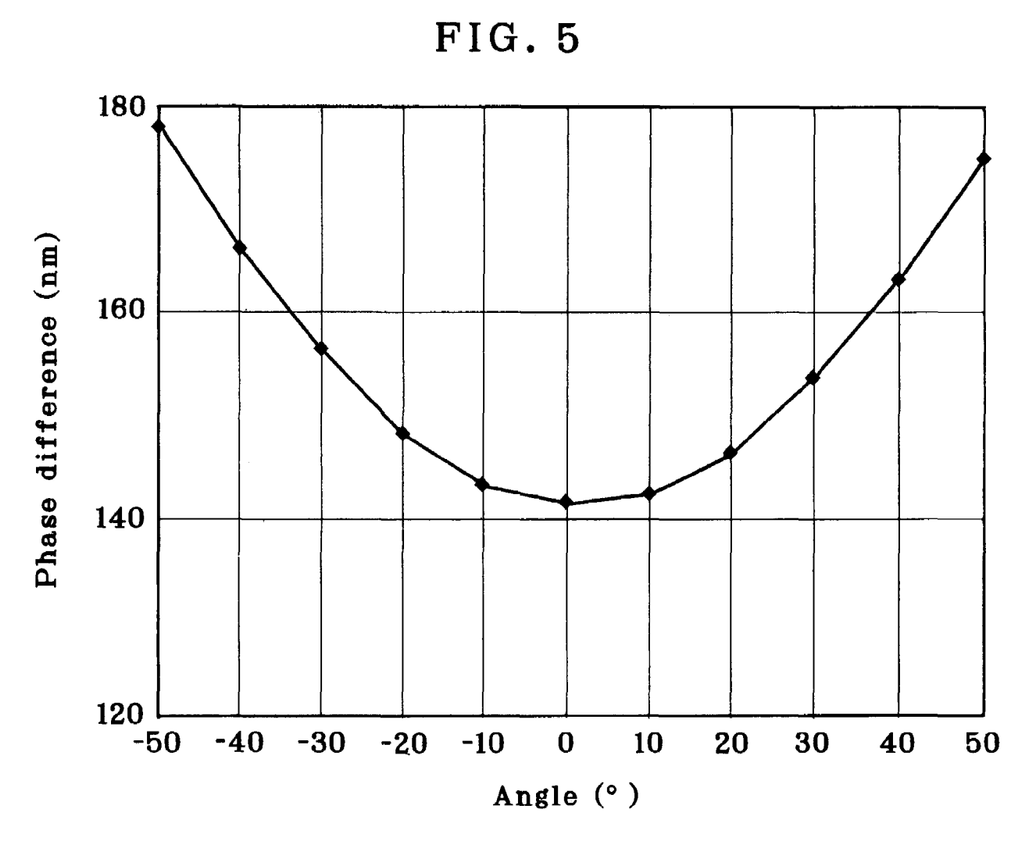
FIG. 5 is diagrammatically illustrative of the dependency on angle of a phase difference in one embodiment of the laminated retardation layer of the invention, as expressed in terms of an optical path difference.

A laminated retardation layer 10 prepared by lamination of the stretched polymer film 11 and the chiral nematic (cholesteric) liquid crystal layer 12 was measured for the dependency on angle of a phase difference represented by an optical path difference (nm), using a double refraction meter ("CO-BRA®" made by Oji Keisoku Co., Ltd.). The results are plotted in FIG. 5, indicating that there has been obtained the dependency on angle of the phase difference demanded for improving the viewing angle characteristics of a VA mode liquid crystal display constructed as shown in FIG. 2(a). It is noted that FIG. 5 shows the results measured at a sodium d-line from a direction orthogonal to the optical axis of the positive A-plate a.

(4) Construction of Vertical Alignment Display

A laminated retardation layer 10 obtained as described at (1) to (3) was positioned on the viewing side of a VA mode liquid crystal display constructed as shown in FIG. 2(a). A stretched polymer film 11 was laminated on a viewing side-sheet polarizer 5 while a chiral nematic (cholesteric) liquid crystal layer 12 was laminated on a viewing side-transparent substrate 1. A liquid crystal material MLC-6608 (made by Merck & Co., Inc.) having negative dielectric anisotropy was poured as a VA mode liquid crystal layer 3 in the assembly to set up a VA mode liquid crystal display. In this case, the retardation of the positive A-plate was adjusted to such a value as to substantially compensate for a leakage of light from the sheet polarizer. On the other hand, the retardation of the negative C-plate was regulated to such a value as to compensate for a leakage of light from the liquid crystal layer. In addition, the negative C-plate was controlled to a retardation value at which remaining leakages of light from the sheet polarizer were compensated for in such a thickness direction that the sum of retardation of the liquid crystal layer (positive C-plate) in the thickness direction and that of the negative C-plate becomes plus.

In terms of a light leakage upon display in black, the thus assembled VA mode liquid crystal display was compared with a liquid crystal display having no laminated retardation layer 10. Light sources of 450 nm, 550 nm and 610 nm were used for B (blue), G (green) and R (red) and EZContrast 160R (made by ELDIM) was used as a measuring device to examine light leakages when light was entered in the liquid crystal displays on black display. The absorption axes of two sheet polarizers were at azimuth angles of 45° and 135°. At the respective wavelengths, it was found that light leakages at the azimuth angles of 0°, 90°, 180° and 270° were much more reduced in the inventive liquid crystal display than in the comparative liquid crystal display having no laminated retardation layer 10. It was also found that even when R, G and B displays were obliquely viewed from the respective azimuth directions, there was little or no color shift. Especially from a comparison with the case where separately fabricated positive A-plate and negative C-plate were bonded together by a tackifier, it was found that improved contrast was achievable with no variations.

While the laminated retardation layer of the invention, its fabrication process and the liquid crystal display incorporating the same have been explained with reference to the principles and examples of the invention, it should be understood that the invention is in no sense limited to them and so various modifications are feasible.

As can be seen from the foregoing, the present invention provides a laminated retardation layer obtained by lamination of a retardation layer having positive index anisotropy and an optical axis in a layer plane and a retardation layer having negative index anisotropy and an optical axis in a normal direction to a layer plane, characterized in that a stretched polymer film having inverse chromatic dispersion that causes retardation defined by an optical path difference between extraordinary light and ordinary light to become small as wavelength becomes short is used as said retardation layer having positive index anisotropy and an optical axis in a layer plane, and a coating layer having normal chromatic dispersion that causes retardation defined by an optical path difference between extraordinary light and ordinary light to become large as wavelength becomes short is used as said retardation layer having negative index anisotropy and an optical axis in a normal direction to a layer plane. Thus, the present invention can successfully provide a laminated retardation layer dedicated to liquid crystal displays, especially a VA mode liquid crystal display, which is constructed of easy-to-fabricate positive A-plates and negative C-plate without recourse to another film-formation substrate, alignment layer or adhesive layer and enables viewing angle characteristics to be improved with high contrast yet with neither color shifts nor inference variations.

I claim:

1. A process for fabrication of a laminated retardation layer obtained by lamination of a retardation layer having positive index anisotropy and an optical axis in a layer plane and a retardation layer having negative index anisotropy and an optical axis in a normal direction to a layer plane, wherein a retardation layer having inverse chromatic dispersion that causes retardation defined by an optical path difference between extraordinary light and ordinary light to become small as wavelength becomes short is used as said retardation layer having positive index anisotropy and an optical axis in a layer plane, and a retardation layer having normal chromatic dispersion that causes retardation defined by an optical path difference between extraordinary light and ordinary light to become large as wavelength becomes short is used as said retardation layer having negative index anisotropy and an optical axis in a normal direction to a layer plane, wherein:

a stretched polymer film having said inverse chromatic dispersion is used as a substrate, and a polymerizable liquid crystal layer is coated and oriented on one surface of said substrate for polymerization, thereby forming said polymerizable liquid crystal layer having said normal chromatic dispersion into a coating layer.

2. The process for fabrication of a laminated retardation layer according to claim 1, characterized in that a polycarbonate film having a fluorene skeleton, obtained by stretching a liquid crystal-containing polycarbonate film, used as said stretched polymer film having said inverse chromatic dispersion.

3. The process for fabrication of a laminated retardation layer according to claim 1, characterized in that a cellulose acetate film, obtained by stretching a cellulose acetate film, is used as said stretched polymer film having said inverse chromatic dispersion.

4. The process for fabrication of a laminated retardation layer according to claim 1, characterized in that a film, obtained by forming into a film a mixture of an aromatic polyester polymer having normal chromatic dispersion and an aromatic polyester polymer film having inverse chromatic dispersion and stretching said film, is used as said stretched polymer film having said inverse chromatic dispersion.

5. The process for fabrication of a laminated retardation layer according to claim 1, characterized in that a film, obtained by forming into a film a polymer comprising a copolymer containing monomer units capable of yielding polymers having different chromatic dispersions and stretching said film, is used as said stretched polymer film having said inverse chromatic dispersion.

6. The process for fabrication of a laminated retardation layer according to claim 1, characterized in that a composite film, obtained by lamination of two stretched films having different chromatic dispersions, is used as said stretched polymer film having said inverse chromatic dispersion.

7. The process for fabrication of a laminated retardation layer according to claim 1, characterized in that a polymerizable chiral (cholesteric) liquid crystal layer is used as said coating layer having said normal chromatic dispersion.

8. The process for fabrication of a laminated retardation layer according to claim 1, characterized in that a polymerizable discotic liquid crystal of homeotropic orientation is used as said coating layer having said normal chromatic dispersion.

9. The process for fabrication of a laminated retardation layer according to claim 1, characterized in that a material that has negative index anisotropy and an optical axis in a normal direction to a layer plane upon coating is used as said coating layer having said normal chromatic dispersion.

* * * * *